(12) United States Patent
Barqawi et al.

(10) Patent No.: US 12,423,540 B2
(45) Date of Patent: Sep. 23, 2025

(54) SYSTEM AND METHOD FOR IDENTIFYING AND UNCOVERING HUMAN TRAFFICKING

(71) Applicant: ProSafe IP LLC, Sewell, NJ (US)

(72) Inventors: Yazan Barqawi, Sewell, NJ (US); Terrance Ruf, Sewell, NJ (US); Tomas Giraldo, Clearwater, FL (US)

(73) Assignee: ProSafe IP LLC, Sewell, NJ (US)

( * ) Notice: Subject to any disclaimer, the term of this patent is extended or adjusted under 35 U.S.C. 154(b) by 0 days.

(21) Appl. No.: 18/914,077

(22) Filed: Oct. 12, 2024

(65) Prior Publication Data
US 2025/0124246 A1    Apr. 17, 2025

Related U.S. Application Data

(60) Provisional application No. 63/544,246, filed on Oct. 16, 2023.

(51) Int. Cl.
*G06K 7/14*    (2006.01)
*G06K 19/06*    (2006.01)

(52) U.S. Cl.
CPC ..... *G06K 7/1417* (2013.01); *G06K 19/06037* (2013.01)

(58) Field of Classification Search
CPC ........ G06K 7/1417; G06K 19/06037
See application file for complete search history.

(56) References Cited

U.S. PATENT DOCUMENTS

| | | | |
|---|---|---|---|
| 11,212,659 B1 | 12/2021 | Barqawi et al. | |
| 2006/0033597 A1* | 2/2006 | Wells | G08B 25/12 333/204 |
| 2006/0271952 A1* | 11/2006 | Gurley | H04N 21/485 348/E5.122 |
| 2012/0105635 A1* | 5/2012 | Erhardt | G07C 5/0866 348/148 |
| 2014/0337957 A1* | 11/2014 | Feekes | H04L 63/18 726/9 |
| 2014/0366055 A1* | 12/2014 | Murakami | H04N 21/41265 725/30 |
| 2017/0105105 A1* | 4/2017 | Dauwe | G08B 25/009 |
| 2022/0253963 A1* | 8/2022 | Fowler | G06Q 50/265 |
| 2023/0018815 A1* | 1/2023 | Mani | H04N 21/488 |
| 2023/0090763 A1 | 3/2023 | Ozturk et al. | |
| 2023/0247410 A1 | 8/2023 | Barqawi et al. | |

FOREIGN PATENT DOCUMENTS

KR    20150020019 A   *  2/2015

OTHER PUBLICATIONS

"Hard Rock International Continues Fight Against Human Trafficking", Feb. 1, 2023 (Year: 2023).*
"How to use and where to place QR codes in your hotel", Oct. 14, 2022 (Year: 2022).*
PCT/US2024/051168International Search Report and Written Opinion mailed Jan. 14, 2025.

* cited by examiner

*Primary Examiner* — Laura A Gudorf
(74) *Attorney, Agent, or Firm* — Joseph E. Maenner; Maenner & Associates, LLC

(57) ABSTRACT

A method for identifying and uncovering and human trafficking is provided. The method includes the steps of displaying a code available to be read by an electronic device; transmitting information to the electronic device; and receiving new information input by a user from the electronic device. The method further includes software for performing the method.

9 Claims, 4 Drawing Sheets

SYSTEM AND METHOD FOR IDENTIFYING AND UNCOVERING HUMAN TRAFFICKING

BACKGROUND OF THE INVENTION

Field of the Invention

The invention relates to a system and method for a person being trafficked to notify a third party that the person is being trafficked.

Description of the Related Art

Human trafficking victims, such as sex trafficking victims, are often brought to hotel rooms to keep them away from family and authorities and to allow the traffickers to better traffic them to willing buyers.

It would be beneficial to provide an innocuous way for a trafficking victim in a hotel room to notify authorities or first responders of the victim's plight and location.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method for identifying and uncovering and human trafficking comprising the steps of displaying a code available to be read by an electronic device; transmitting information to the electronic device; and receiving new information input by a user from the electronic device.

In another embodiment, the invention provides a computer program for performing the above-disclosed method.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
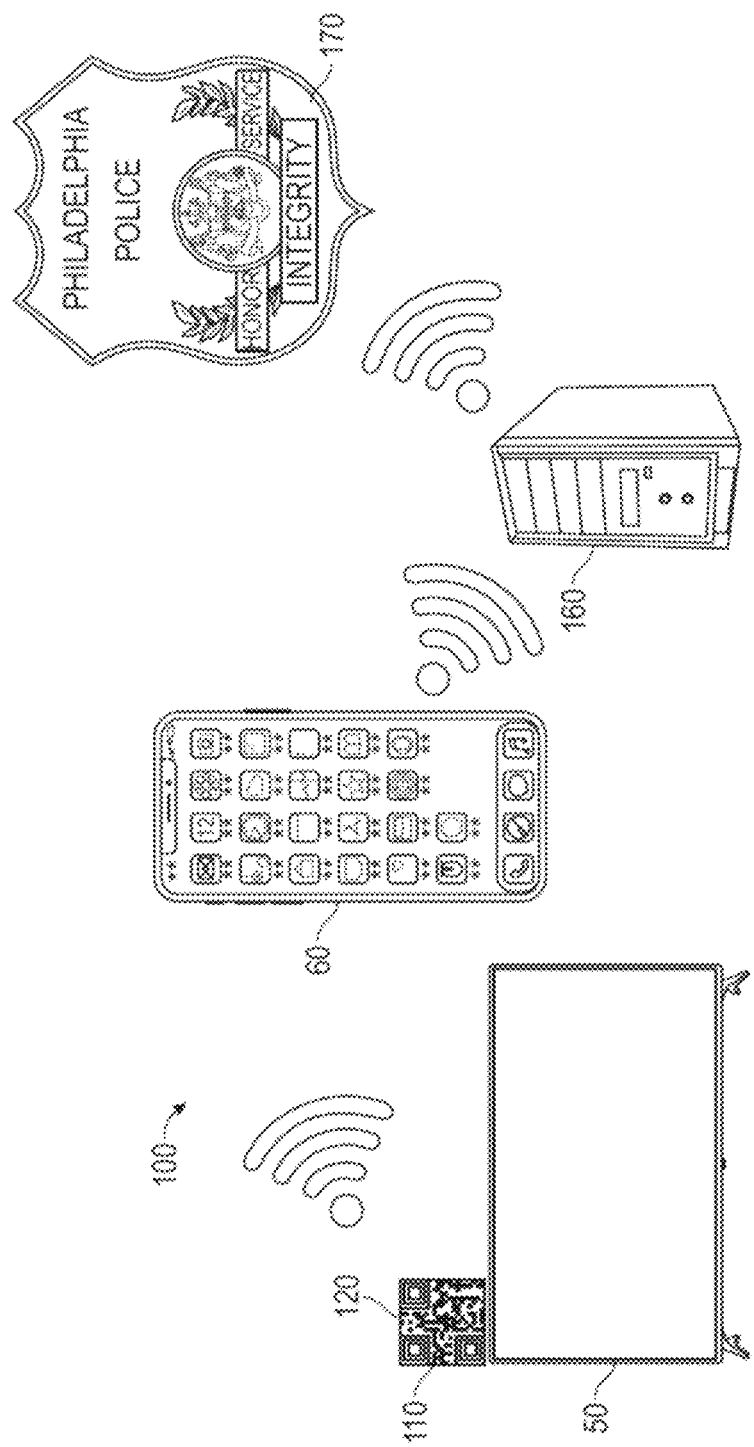
FIG. 1 is a schematic drawing of a system used to identify and uncover human trafficking according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a system and method 100 for identifying and uncovering human trafficking. Because a significant proportion of human trafficking is perpetrated through the use of hotel rooms, system 100 is installed in individual hotel rooms in a hotel to enable a human trafficking victim to communicate their situation without the trafficker knowing.

In a first embodiment, shown in FIG. 1, system 100 includes a set top box 110 that can be mounted on or near a television set 50 in a hotel room. The set top box 110 can display a QR code 120 with innocuous language associated with QR code 120 that will not alert a trafficker that QR code 120 is being used for anti-trafficking purposes. By way of example only, the language may be associated with disarming language, such as, for example, a guest directory, hotel services and other assistance, room service-food, or other such language that may be likely to be acted upon by the victim and ignored by the trafficker.

Upon scanning the QR code 120, information embedded in QR code 120, such as the name of the hotel, the location of the hotel, and the room number, gps location, or other pertinent location information, is transmitted to the scanning device 60, such as a cell phone, an electronic tablet, or other such suitable electronic device. Also, a webpage, an app page, or other electronic information (page 130) is displayed on the scanning device 60.

Figure 2:
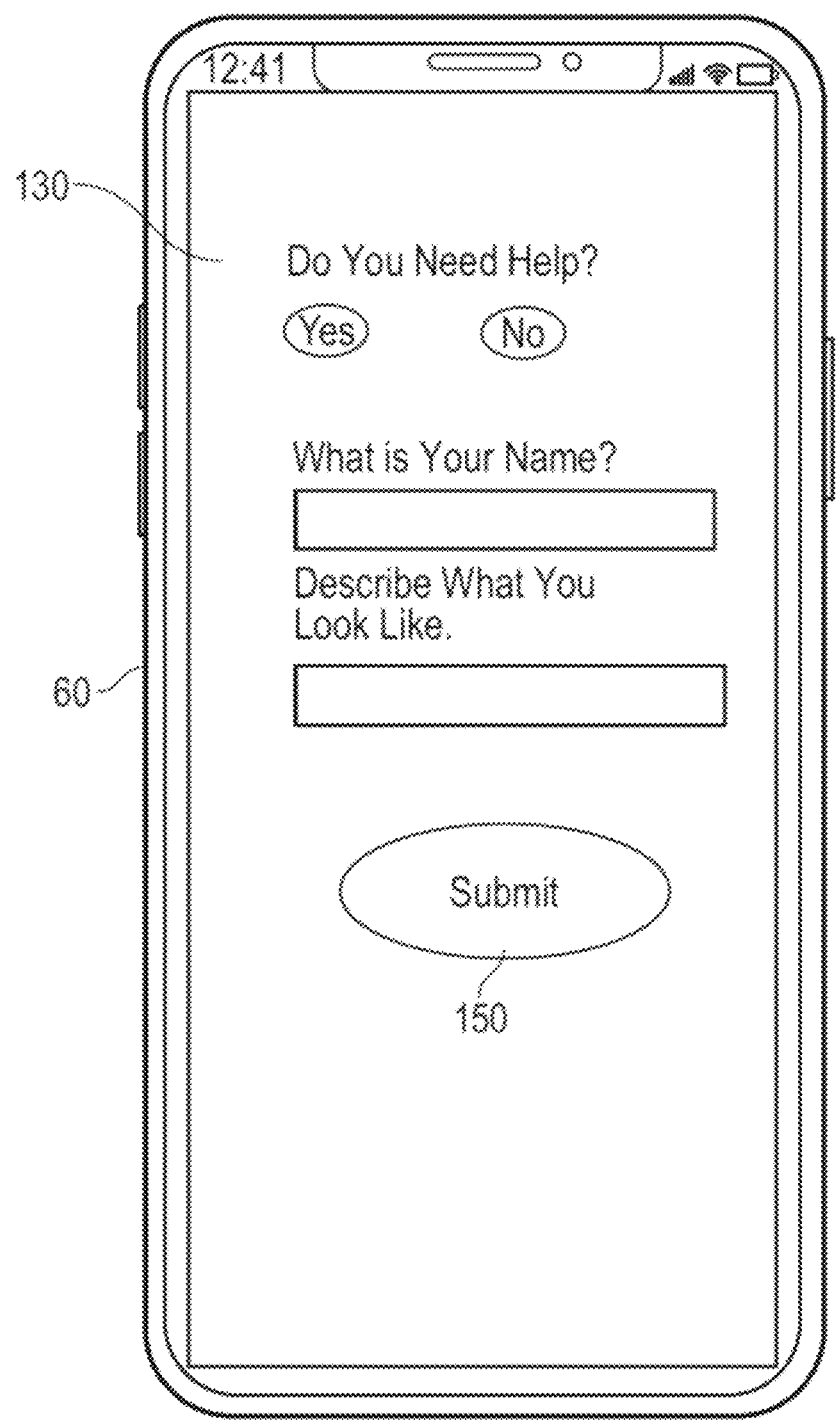
FIG. 2 is an exemplary graphical user interface ("GUI") used with the system of FIG. 1 to receive and transmit information.

As shown in the exemplary embodiment of FIG. 2, page 130 can request information about the victim, such as, name, age, physical description, name and physical description of the trafficker, whether the trafficker is armed, and other potentially pertinent information. The requests can be in the form of open-ended questions or closed questions with answers (such as Yes/No) pre-supplied with an ability to select the desired answer. A exemplary question displayed on page 130 can be "Do you need help?", with a Yes/No answer associated with the question. If "yes" is selected, a drop-down box can be generated with a list of potential help that the victim is looking for. Alternatively or in addition, a write-in box can also be provided for the victim to write in the type of help that they need.

When the victim selects the "Submit" button 150, the screen 130 disappears, so that the trafficker cannot see what the victim had been doing. By clicking on "Submit" the device's cache is cleared. By way of example only, on an iPhone, the web browser history and website data is cleared so that the trafficker cannot see what the victim had been doing if the trafficker searches through the device 60.

Upon pressing "Submit" button 150, all uploaded information is electronically transmitted from device 60 to a back end server 160 that can be located in the hotel manager or security office. The information is processed through a machine learning algorithm to "interpret" what the victim input, and to pick up key "trigger" words pre-loaded into the algorithm. Exemplary trigger words can be "kidnaped", "help", "slave", "gun", or other words. The trigger words can be in English or other language and non-English words can be translated to English to see if any of those words constitute trigger words. If any trigger words are identified, an alert can be transmitted to a workstation at the hotel, such as a manager's or a security officer's computer, so that the receiver of the alert can notify the local police 170. Alternatively or in addition, if specific trigger words are identified, the local police 170 are automatically notified with all of the information received from the victim.

Figure 3:
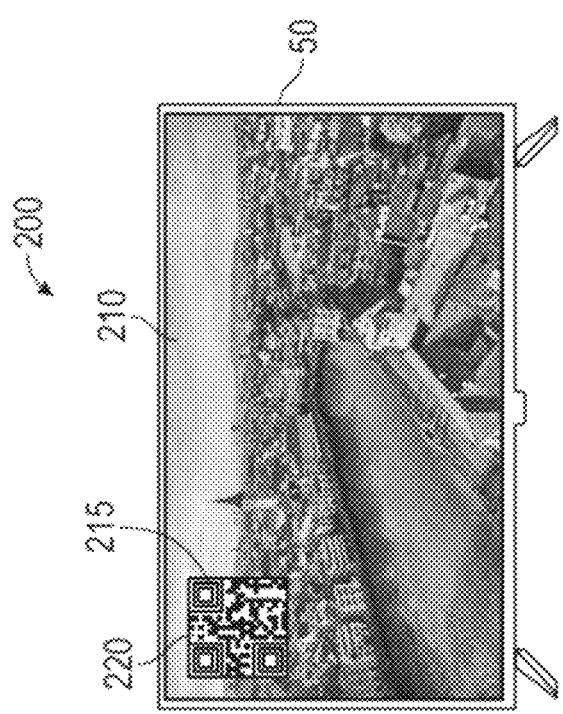
FIG. 3 is a schematic drawing of a system used to identify and uncover human trafficking according to an alternative exemplary embodiment of the present invention.

In an alternative embodiment of a system 200, shown in FIG. 3, instead of a set top box 110, a picture 215 in the screen 210 of television set 50 can be displayed only when television 50 is initially turned on and disappears after a predetermined amount of time. Picture 215 can contain a QR code 220, similar to QR code 120, with associated language as described above, that can be scanned by device 60. Once QR code 220 is scanned, the system 200 operates as described above with respect to QR code 120.

Figure 4:
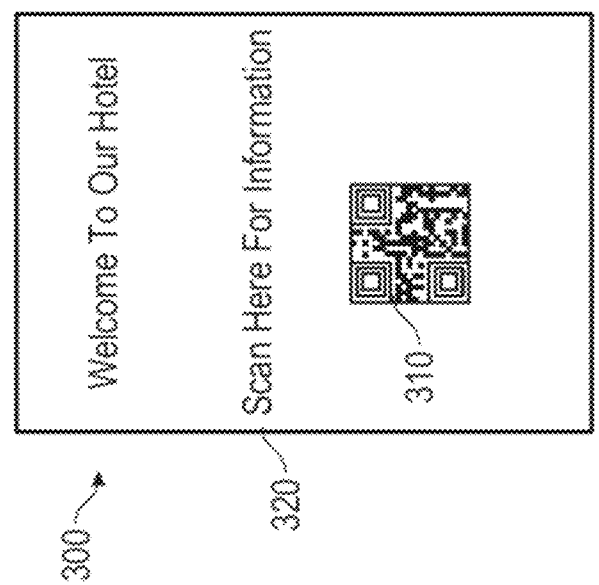
FIG. 4 is a schematic drawing of a system used to identify and uncover human trafficking according to another exemplary embodiment of the present invention.

In an alternative embodiment of a system 300, shown in FIG. 4, instead of a set top box 110 or a picture 215 inside a screen 210 once television set 50 is turned on, a QR code 310 can be merely a printed card 320 located in the room, such as on a night stand next to a bed. When QR code 310 is scanned by device 60, system 300 operates in the same manner as described above with respect to systems 100, 200.

Figure 5:
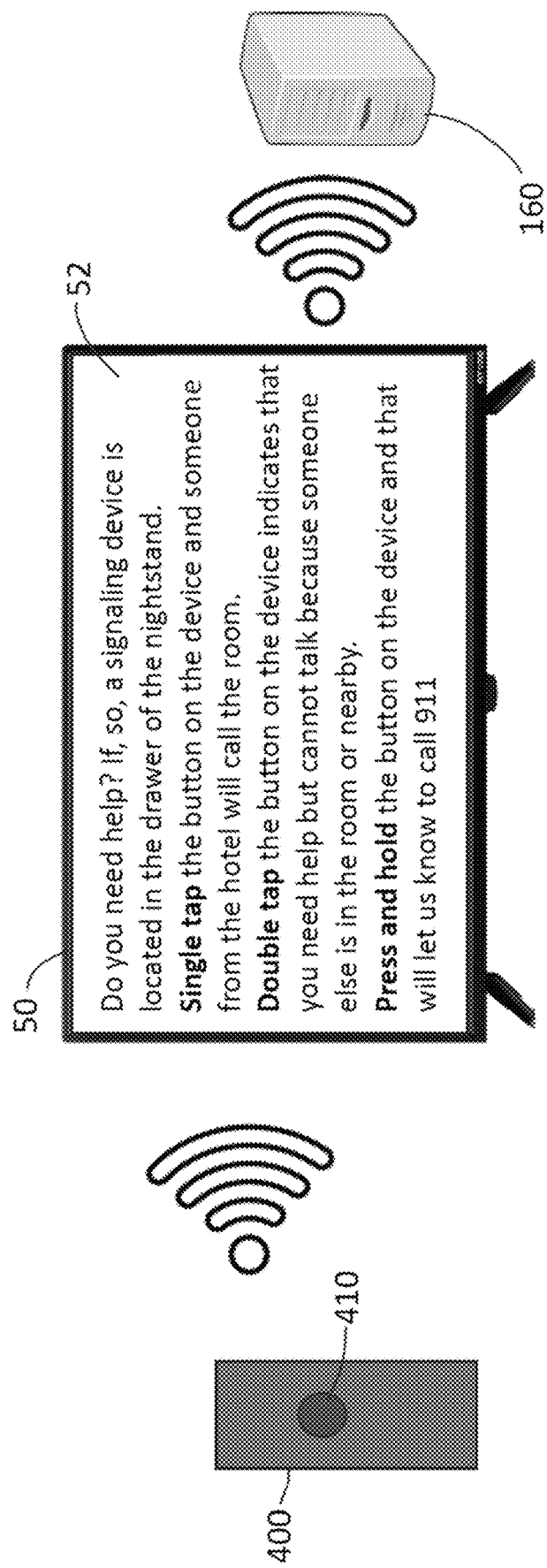
FIG. 5 is a schematic drawing of a system used to identify and uncover human trafficking according to yet another exemplary embodiment of the present invention.

In still another embodiment, shown in FIG. 5, if a victim is without a cell phone and cannot scan QR code 120, 220 310, a panic button 410 on a device 400 can be located somewhere in the room, such as in a drawer, under a nightstand, or in a closet in the room.

When the victim turns on television 50, and scrolls through options, such as, channels, room service, request services, etc., a screen 52 pops up. Screen 52 provides information about where device 400 is located and how to activate device 400.

Exemplary information provided on screen 52 can be:

"Do you need help? If, so, a signaling device is located in the drawer of the nightstand.

Single tap the button on the device and someone from the hotel will call the room.

Double tap the button on the device indicates that you need help but cannot talk because someone else is in the room or nearby.

Press and hold the button on the device and that will let us know to call 911."

When the victim presses button 410 for the amount or duration of time desired, device 400 transmits an electronic signal to television 50, which in turn is connected to server 160 and transmits a signal to server 160 according to the quality of the signal, such as, for example, the number of times or duration of time that button 410 is pressed. Server 160 then initiates the desired action. After a predetermined amount of time or after the victim presses panic button 410, device 400 transmits an electronic signal to television 50 so that screen 52 disappears from view on television 50.

The present invention also provides a non-transitory machine-readable storage medium, having encoded thereon program code, wherein, when the program code is executed by a machine, the machine implements the method for performing the steps of any of the embodiments of the invention disclosed above.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method for identifying and uncovering human trafficking comprising the steps of:
  (a) displaying information to be read from a display on a first electronic device at a location;
  (b) providing a signaling device;
  (c) receiving input at the first electronic device from the signaling device; and
  (d) after step (c), transmitting an electronic signal from the first electronic device to a second electronic device, wherein the input comprises one of:
    singly tapping the signaling device to generate a first response;

doubly tapping the signaling device to generate a second response; and pressing and holding the signaling device to generate a third response, wherein the signaling device comprises a single dedicated alert button fixedly hidden at one of in a drawer, under a nightstand, and in a closet, wherein the second response further comprises signalling that another person is at the location.

2. The method according to claim 1, wherein the information comprises instructions regarding the use of the signaling device.

3. The method according to claim 1, wherein step (d) comprises generating a different electronic signal based on different inputs of the input received from the signaling device.

4. The method according to claim 1, further comprising the step of:

performing one of a plurality of actions based on a quality of the electronic signal.

5. The method according to claim 1, wherein the first response comprises generating a phone call to the location.

6. The method according to claim 2, wherein the second response comprises transmitting a call for help.

7. A non-transitory machine-readable storage medium, having encoded thereon program code, wherein, when the program code is executed by a machine, the machine implements a method for identifying and uncovering human trafficking comprising the steps of:

(a) displaying information to be read from a display on a first electronic device at a location;

(b) providing a signaling device;

(c) receiving input at the first electronic device from the signaling device wherein the input comprises one of:

singly tapping the signaling device to generate a first response;

doubly tapping the signaling device to generate a second response; and pressing and holding the signaling device to generate a third response; and (d) after step (c), transmitting an electronic signal from the first electronic device to a second electronic device, (e) wherein the signaling device comprises a single dedicated alert button fixedly hidden at one of in a drawer, under a nightstand, and in a closet, (f) wherein the third response comprises signalling a third party to call 911.

8. A method for identifying and uncovering human trafficking comprising the steps of:

(a) displaying information to be read from a display on a first electronic device at a location;

(b) providing a signaling device;

(c) receiving input at the first electronic device from the signaling device; and (d) after step (c), transmitting an electronic signal from the first electronic device to a second electronic device, wherein the input comprises one of:

singly tapping the signaling device to generate a first response;

doubly tapping the signaling device to generate a second response; and pressing and holding the signaling device to generate a third response, wherein the second response further comprises signalling that another person is at the location.

9. The method according to claim 8, wherein the third response comprises signalling a third party to call 911.

* * * * *